Figure 1:
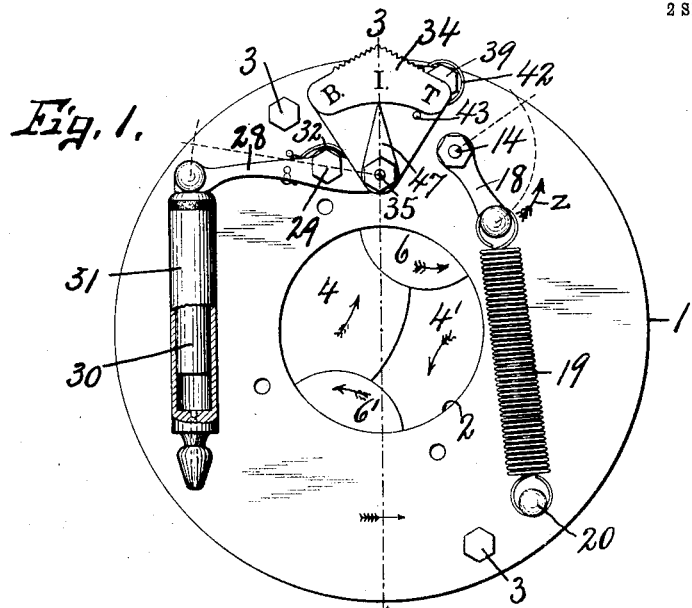

No. 778,334. PATENTED DEC. 27, 1904.
J. A. RICKETTS.
CAMERA SHUTTER.
APPLICATION FILED MAR. 15, 1904.
MODEL. 2 SHEETS—SHEET 1.

WITNESSES,
B. E. Robinson.
H. E. Chase

INVENTOR,
John A. Ricketts
BY,
Howard P. Denison
ATTORNEY.

No. 778,334. PATENTED DEC. 27, 1904.
J. A. RICKETTS.
CAMERA SHUTTER.
APPLICATION FILED MAR. 15, 1904.
MODEL. 2 SHEETS—SHEET 2.

WITNESSES,
B. E. Robinson.
H. E. Chase

INVENTOR.
John A. Ricketts
BY
Howard P. Denison
ATTORNEY.

No. 778,334.					Patented December 27, 1904.

UNITED STATES PATENT OFFICE.

JOHN ASA RICKETTS, OF ITHACA, NEW YORK.

CAMERA-SHUTTER.

SPECIFICATION forming part of Letters Patent No. 778,334, dated December 27, 1904.

Application filed March 15, 1904. Serial No. 198,225. (Model.)

*To all whom it may concern:*

Be it known that I, JOHN ASA RICKETTS, of Ithaca, in the county of Tompkins, in the State of New York, have invented new and useful Improvements in Camera-Shutters, of which the following, taken in connection with the accompanying drawings, is a full, clear, and exact description.

This invention relates to improvements in photographic shutters, and refers more particularly to the shutter-blades and their operating and controlling mechanism. These shutters usually consist of one or more blades or wings movable in opposite directions across the exposure-opening and are so arranged that the period of exposure is greatest at certain points than at others—as, for instance, when the blades open from the center or focal axis outwardly and then return to their closed position the center of the opening is the first to be uncovered and is the last to be closed. Therefore with such an arrangement of the shutter blades or wings the exposure is greatest at the center or in line with the focal axis of the lens. In other instances an oscillatory shutter is provided with an aperture and is movable across the exposure-opening or lens from the periphery of the opening inwardly and back again, and in such a case the exposure is greatest where the aperture in the shutter leaves and returns to the periphery of the exposure-opening. This causes an unequal exposure of the plate, particularly in instantaneous or bulb exposures, and therefore produces an imperfect negative.

The object of my invention is to obviate this inequality in the period of the exposure of the different parts of the plate, or rather to expose all parts of the plate equally. Briefly stated, this is accomplished by providing shutter-blades which are caused to rotate always in the same direction and are arranged to open gradually from the periphery of the exposure-opening inwardly toward the center and to close gradually at the point or points first opened, so that the parts of the plate which are first exposed are also the first to be cut off from the light, or, in other words, the light is shut off in the order of its entrance.

Another object is to provide a rotary stop-cam moving in synchrony with the shutters and coöperating with the manually-adjusted exposure-controlling mechanism, whereby the movement of the shutter-blades is controlled for "bulb," "instantaneous," or "time" exposures.

Other objects and uses will appear in the following description.

Figure 2:
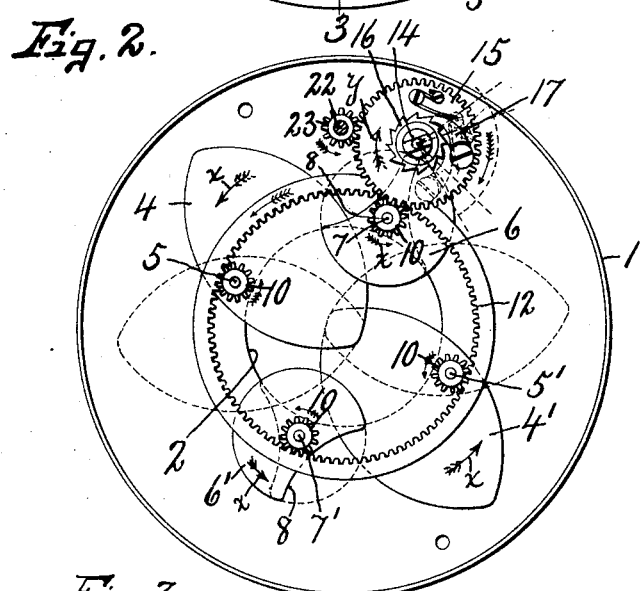
Figure 3:
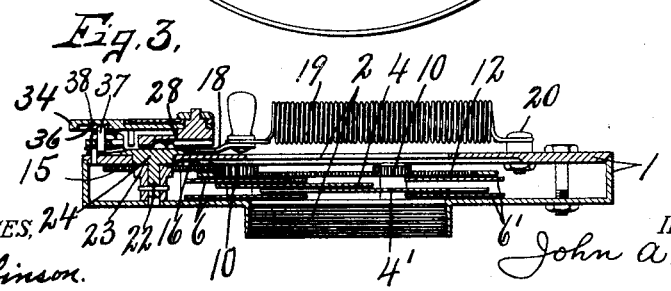

In the drawings, Figure 1 is a face view of the shutter-case and the various features of my invention mounted thereon, the shutters being shown in their closed position. Fig. 2 is a view similar to Fig. 1, except that the face-plate is removed for disclosing the interior shutters and their operating and controlling mechanisms, the shutters being shown in full lines as being partially open and in dotted lines as still farther opened, the arrows showing the direction of movement of the parts. Fig. 3 is a sectional view taken on line 3 3, Fig. 1. Fig. 4 is a view similar to Fig. 2, except that the blades are shown in their full open position. Figs. 5 and 6 are enlarged detail views of the shutter-controlling mechanism as used for instantaneous exposures, the parts being shown in their normal or starting position in Fig. 5 and in their return position in Fig. 6 after the bulb has operated the piston which moves the controlling-lever. Figs. 7 and 8 are views similar to Figs. 5 and 6, showing the controlling parts in their position for bulb exposures, Fig. 7 representing the starting position and Fig. 8 the stopping position, with the shutters open. Figs. 9 and 10 are views similar to Figs. 7 and 8, showing the parts as used for time exposure, Fig. 9 showing the parts in their starting position and Fig. 10 showing said parts in position to hold the shutters in their open position. Figs. 11, 12, 13, and 14 are perspective views respectively of the controlling-lever, the adjustable indicator-plate for different exposures, the governing cam or eccentric, and the index-finger.

Similar reference characters indicate corresponding parts in all the views.

In carrying out the objects stated I provide a shutter-case 1 with a central circular exposure-opening 2 through its front and rear walls, the front wall being removable to permit the interior mechanism to be assembled and is held in place by suitable fastening means, as clamping bolts or screws 3. A pair of rotary shutter-blades 4 and 4' are eccentrically pivoted at 5 and 5' within the case at diametrically opposite sides of the opening 2, but in different planes, so that they may rotate in intersecting arcs across the opening. These blades are usually formed of thin sheet metal and are of substantially the same size and form—in this instance elliptical—and are secured to their respective pivots 5 and 5'. These pivots or spindles are located on the short axes of their respective blades and at one side of their long axes, so that each blade constitutes an eccentric with their major parts lying on opposed sides of their swinging axes when in their extreme open or closed positions—that is, when the blades are in their closed position, as seen in Fig. 1, they extend beyond the center of the opening 2, and therefore one overlaps upon the other, but when in their extreme open positions, as seen in Fig. 4, the major portions of the blades are disposed symmetrically at diametrically opposite sides of the opening, with their inner edges substantially coincident with the adjacent sides of the opening 2, and when these blades are in their extreme open or closed positions their short axes lie in a straight line drawn through the swinging axes or pivots 5 and 5'. When in their closed position, these blades 4 and 4' nearly close the opening 2 and may, in fact, if desired, be made to entirely close the opening; but I preferably employ a separate pair of shutter-blades 6 and 6', which are centrally mounted upon pivots or spindles 7 and 7' at diametrically opposite sides of the opening 2 and equidistant from the pivotal axes 5 and 5' of the blades 4 and 4', so that the swinging axes of all the blades are located in a circle concentric with the opening 2. The blades 6 and 6' are also identical in size and form, and a portion of the periphery of each is cut away at 8 to coincide with the periphery of the opening 2 when the blades are in their open position, as seen in Fig. 4, the peripheries of the remaining portions of said blades 6 and 6' being concentric with their swinging axes. It therefore follows that when these blades are moved to their closed position they extend partially across the opening 2 and together with the blades 4 and 4' completely close said opening. All of these blades rotate in the same direction, as indicated by arrows X, Figs. 2 and 4, and in order to accomplish this movement simultaneously I provide the spindle or pivot of each blade with a pinion 10, and each pinion meshes with an internal gear or idler 12, which surrounds the exposure-opening 2. These pinions 10 are all the same size, and therefore the rotation of any one of them causes a similar rotation of the other pinions through the medium of the connecting idler or gear 12, and a complete revolution of each pinion causes a similar complete revolution of its shutter-blade, so that one revolution of the pinions moves the blades from their closed position to their normal open position and back again to the closed position, and I have provided suitable mechanism for effecting a single revolution or part of a revolution of these blades, as may be desired for instantaneous or time exposures.

The distinguishing feature in the construction and arrangement of the shutter-blades lies in the fact that they are moved always in the same direction and open and close inwardly from the periphery of the exposure-opening and that the parts of the plate which are first exposed are always first cut off from the light, thereby establishing a uniform exposure throughout the surface of the plate. This action may be better understood by reference to Figs. 1, 2, and 4, and particularly Fig. 2, in which it will be observed that portions of the shutters have been moved from the periphery of the exposure-opening inwardly toward the center from the normal position,(seen in Fig. 1,) thus gradually exposing parts of the opening at opposite sides of the focal axis of the lens, but still keeping the center of the opening closed, and that the continued rotation of the shutter-blades in the same direction causes other parts of the said blades to gradually close the parts first opened from the periphery inwardly toward the center in substantially the same order of opening, the portion of the opening at and immediately surrounding the focal axis being the last to open and also the last to close. The actinic effect appears to be more intense at and immediately around the focal axis on the sensitized plate than upon the outer edges of the plate, and by gradually exposing the plate from the margin inwardly toward the center this inequality in the exposure is neutralized, or rather equalized.

It has been previously stated that the driving means for actuating the shutters may be applied to any one of the pinions 10, and I have shown a driving means as operatively connected to the pinion on the spindle 7, Figs. 2 and 4, and consisting of a rotary spindle 14, journaled within the case 1 and upon which are mounted a gear 15 and a ratchet-wheel 16, the gear 15 being loose on the spindle 14 and meshing with the pinion on the spindle 7 and is provided with a pawl 17, while the ratchet-wheel 16 is secured to said spindle 14 and engages the pawl 17 to transmit rotary motion from the spindle 14 to the gear 15. The spindle 14 is rotated in the direction indicated by arrow y, Fig. 2, by means of a crank-arm 18, to which is connected one end of a spring-motor 19, having its other end anchored to a suitable stud 20 on the front wall of the case 1, the lever 18 being also at the front of the case and is secured by any suitable fastening means to the spindle 14. The lever 18 is rocked by hand in the direction indicated by arrow $z$ against the action of the spring 19 and through an arc of substantially ninety degrees or sufficient to cause one complete revolution of the pinions 10, when the spring 19 returns the lever to its normal or starting position, thus causing one complete revolution of each of the shutter-blades—as, for instance, for instantaneous exposures.

It is necessary to provide some means for limiting the rotation of the blades to one complete revolution, and in this instance this means consists of a rotary spindle 22, to which are secured a pinion 23 and a disk or head 24, the latter projecting through an opening in the front wall of the case 1, and is provided with a stop shoulder or projection 25. The pinion 23 meshes with the gear 15 and is of substantially the same size as the pinions 10, so that its degree of movement is the same as and governs the movement of the shutter-blades. The stop-shoulder 25 is eccentrically mounted upon the rotating disk 24 and coöperates with suitable shoulders 26 and 27 upon one arm of the lever 28 to control the action of the shutter-blades, or rather to limit such action to one complete revolution. The lever 28 is pivoted at 29 to the front wall of the case 1 and may be operated by hand or by pneumatics through the medium of the plunger or piston 30, and a suitable bulb (not shown) is connected to the cylinder, as 31, in which the piston 30 is movable. The lever 28 is held in its normal or starting position by a suitable spring 32, Figs. 1, 5, and 6, and the shoulder 28 normally lies in the path of movement of the stop-shoulder 25, as best seen in Fig. 5, which is the starting position for bulb, instantaneous, and time exposures.

The shoulders 26 and 27 are separated from each other a sufficient distance to permit the stop-shoulder 25 to pass between the shoulders 26 and 27 when the lever 28 is rocked from its normal position to the position seen in Fig. 6, in which position the shoulder 26 is moved out of the path of the stop-shoulder 25 and the shoulder 27 is moved into the path of said stop-shoulder to temporarily retard the revolution of the disk 24, although in this position the shutters are closed, and as soon as the lever 28 returns to its normal position the shoulder 26 is again brought into the path of the stop-shoulder 25 to hold the disk 24 from further rotation until another exposure is required. The operation just described is for instantaneous exposures, and in order to accommodate this mechanism to bulb or time exposures I provide an index-plate 34, which is pivotally mounted at 35 upon the end of the lever carrying the shoulders 26 and 27 and is provided with a concentric slot or recess 36, in which rides a pin 37 on the pawl 38. This pawl is pivoted at 39 to the front wall of the case 1 and is provided with a tooth 40, which is movable into and out of the path of the stop-shoulder 25 of the disk 24 to limit the movement of said disk on the half-revolution from its normal or starting position when the lever 28 is rocked from its normal position, as seen in Fig. 8—as, for instance, in bulb exposures, as seen in Figs. 7 and 8. In this operation for bulb exposures the plate 34 is rocked by hand to the right, as indicated by arrow $m$, Figs. 7 and 8, until it engages the left-hand end of the slot 36 on the pawl 38, which limits the rocking movement of the plate 34.

The tooth 40 of the pawl 38 is normally held out of the path of the shoulder 25 by the walls of the slot 36 and also by a suitable spring 42 when the lever 28 is in its normal position, as best seen in Fig. 7, at which time the stop 25 is engaged with the shoulder 26; but as soon as the lever 28 is rocked to the position seen in Fig. 8 the tooth 40 is drawn into the path of the shoulder 25, it being understood that the lever 18 has been previously rocked to tension the spring 19, so that as soon as the lever 28 is rocked from its normal position the disk 24 is released and rotates substantially half a revolution until limited by the engagement of the shoulder 25 with the tooth 40. The lever is maintained in this position by the operator as long as desired; but immediately upon its release it is returned to its normal position by the spring 32, which forces the tooth 40 out of the path of the stop 25 and permits the disk 24 to return to its normal position ready for another operation or exposure. Now assuming that it is desired to give a time exposure, then the plate 34 is rocked in the direction indicated by arrow $n$, Figs. 9 and 10, and the lever 18 is again rocked outwardly to tension the spring-motor 29. This plate 34 is provided with a projection 43 on its rear face, and its relative location is such that when the plate is moved to the position seen in Figs. 9 and 10 the projection 43 lies in the path of the revolution of the stop 25, so as to stop the rotation of the disk 24 at substantially a half-revolution from its normal or starting position, thus limiting the movement of the blades and holding them in their full open position, as best seen in Fig. 10, and these movable parts are retained in this position as long as desired, it being understood that the lever 28 has been previously operated to release the shoulder 25 from engagement with the shoulder 26, as seen in Fig. 9, and that after the disk 24 has been stopped on the half-revolution, as seen in Fig. 10, it is necessary to again operate the lever 28 to force the projection 43 out of the path of the stop 25, whereupon the disk 24 is free to complete its revolution. In this latter operation when the lever 28 is first rocked to release the stop 25 from engagement with shoulder 26, the tooth 40 and pawl 38 is drawn into the path of the shoulder 25 to engage the stop 25 and limit the movement of the disk 24 to a half-revolution; but immediately upon the release of the lever 28 the tooth 40 is moved out of the path of the shoulder 25 and the projection 43 is instantly moved into the path of said stop to hold it and the disk 24 in the position just described until the lever 28 is again operated.

The central portion of the slot 36 is enlarged radially to prevent the operation of the pawl 38 when the plate 34 is set for instantaneous exposures. Therefore the disk 24 is free to make a complete revolution when the lever 28 is operated.

The shoulders 26 and 27 on the lever 28 constitute an escapement for the stop-shoulder 25, and the tooth 40 and projection 43 also form an escapement for the stop-shoulder 25 on the half-revolution of the disk 24.

The plate 34 is provided with the characters "B," "I," "T," representing the different exposures—such as bulb, instantaneous, and time exposures—and the spindle, as 35, on the lever 28, upon which the plate 34 is pivoted, is provided with a fixed index-finger 47, with which the different characters "B," "I," and "T" may be registered for the different exposures.

The operation of my invention, briefly stated, is as follows: The plate 34 is first rocked upon its axis to bring the desired character for a certain exposure—as, for instance, "I," instantaneous—into registration with the index-finger 47. The lever 18 is then rocked outwardly substantially a quarter of a revolution against the action of the spring 19, which latter operation rotates the ratchet-wheel 16 irrespective of the gear 15. The shutters are now closed, and the spring 19 is tensioned to actuate the driving mechanism for the shutter-blades; but such driving mechanism is held from action by reason of the engagement of the stop-shoulder 25 with the shoulder 26 on the lever 28. Assuming now that the plate 34 is set for instantaneous exposures, as seen in Figs. 1, 5, and 6, then as soon as the lever 28 is rocked from its normal position by hand or by the plunger 30 the shoulder 26 is drawn out of the path of the stop-shoulder 25 and the spring 19 then actuates the lever 18 to rotate the gear 15 through the medium of the pawl 17 and ratchet 16, which in turn transmits motion to the pinions 10 and circular rack 12, and the disk 24 is free to make a complete revolution or until the stop-shoulder 25 again comes in contact with the shoulder 26. The operation for the bulb and time exposures is substantially the same except as previously described.

Having thus described my invention, what I claim, and desire to secure by Letters Patent, is—

1. The combination with a photographic shutter-case having an exposure-opening, of shutter-blades pivoted at different points around the opening and rotatable in one direction only, and driving mechanism for said blades.

2. The combination with a photographic shutter-case having an exposure-opening, of shutter-blades rotatable in one direction only and each provided with a pinion, a circular toothed rack engaging said pinions, and a motor connected to rotate the rack.

3. The combination with a photographic shutter-case having an exposure-opening, of shutter-blades rotatable in one direction only, driving mechanism for said blades, and an escapement mechanism for controlling the action of the driving mechanism.

4. The combination with a photographic shutter-case, having an exposure-opening, of shutter-blades rotatable in one direction only and each provided with a pinion, a circular toothed rack engaging said pinions, a motor connected to rotate the rack, and an escapement mechanism for controlling the action of the motor.

5. The combination with a photographic shutter-case having an exposure-opening, of shutter-blades rotatable in one direction only and each provided with a pinion, an internal gear meshing with the pinions, and a motor connected to drive the gear.

6. The combination with a photographic shutter-case having an exposure-opening, of a pair of elliptical shutter-blades rotatable in one direction only, driving mechanism for said blades, and an escapement mechanism controlling the action of the driving mechanism.

7. The combination with a photographic shutter-case having an exposure-opening, of shutter-blades rotatable in one direction only, driving mechanism for said blades, and means to limit the rotation of the blades to one complete revolution at a time.

8. The combination with a photographic shutter-case having an exposure-opening, of shutter-blades rotatable in one direction only, driving mechanism for said blades, a rotary disk driven by said mechanism and provided with a stop-shoulder, and a lever having shoulders coacting with the stop-shoulder to control the action of the driving mechanism.

9. The combination with a photographic shutter-case having an exposure-opening, of shutter-blades rotatable in one direction only, driving mechanism for said blades, a rotary disk driven by said mechanism and provided with a stop-shoulder, a pawl movable into and out of the path of said shoulder, and an index-plate operable manually and connected to actuate the pawl.

10. The combination with a photographic shutter-case having an exposure-opening, of a plurality of rotary shutter-blades each having a pinion, a circular toothed rack meshing with the pinions, a separate gear meshing with one of the pinions, a manually-tensioned spring-motor connected to rotate said gear, a rotary disk driven by the gear and provided with a stop-shoulder, a movable abutment coacting with said stop-shoulder to control the action of the gear and its operating-spring, a second pawl movable into and out of the path of said stop-shoulder, and an index-plate movable manually and connected to move the second pawl for the purpose described.

11. In a photographic camera, a shutter-blade rotating in one direction only, and a driving-gear operatively connected to actuate the blade, and a manually-tensioned spring-motor connected to rotate the gear.

12. In a photographic camera, a shutter-blade rotating in one direction only, a driving-gear operatively connected to actuate the blade, a manually-tensioned spring-motor connected to rotate the gear, and manually-controlled escapement for controlling the action of driving-gear.

13. In a photographic camera, a shutter-blade, rotating in one direction only, a driving-gear operatively connected to actuate the blade, a manually-tensioned spring-motor connected to rotate the gear, a manually-controlled escapement for controlling the action of driving-gear, a rotary stop actuated by the gear, and manually-controlled means coacting with the stop to control the action of the driving-gear.

14. In a photographic camera, a shutter-blade rotating in one direction only and provided with a pinion, a driving-gear meshing with the pinion, a manually-tensioned spring-motor connected to actuate the gear, a rotary stop actuated by the gear, and a manually-controlled shoulder movable into and out of the path of the stop to control the action of the driving-gear.

15. In a photographic camera, the combination of separate shutter-blades each rotating in one direction only, with operating means therefor.

16. In a photographic camera, rotary shutter-blades opening from the periphery toward the center of the exposure-opening and closing in the same order, and means to actuate the blades simultaneously.

17. In a photographic camera, rotary shutter-blades pivoted at diametrically opposite sides of the exposure-opening and moving from the periphery toward the center of the exposure-opening, and means to actuate the blades.

18. In a photographic camera, the combination of two shutter-blades each rotating in one direction only, and a spring-motor operatively connected to actuate the blades.

19. In a photographic camera, the combination of two shutter-blades each rotating in one direction only, a manually-tensioned spring-motor operatively connected to actuate the blades, and manually-controlled mechanism to stop the blades in different positions.

20. In a photographic camera, the combination of separate pairs of shutter-blades each rotatable in one direction only, with means to actuate the blades simultaneously.

21. In a photographic camera, the combination of separate pairs of shutter-blades each rotatable in one direction only, those of each pair being similar and opening from the periphery toward the center of the exposure-opening and closing in the same order, and means to actuate the blades together.

22. In a photographic camera, the combination of similar blades rotating in one direction only, means to actuate the blades together, and mechanism to stop and release the actuating means.

23. In a photographic camera, the combination of a plurality of shutter-blades each rotatable in one direction only and opening from the periphery toward the center of the exposure-opening and closing in the same order, a manually-tensioned spring operatively connected to rotate the blades, and manually-controlled mechanism operatively connected to stop and to release the motor.

24. In a photographic camera, the combination of a shutter-blade rotatable in one direction only, said blade opening from the periphery toward the center of the exposure-opening and closing in the same order, means to actuate the blade, and manually-controlled mechanism for stopping and releasing the actuating means.

In witness whereof I have hereunto set my hand this 9th day of March, 1904.

JOHN ASA RICKETTS.

Witnesses:
  JOSEPH E. TRAVOR,
  HENRY H. NORRIS.